United States Patent
Laughlin et al.

(10) Patent No.: US 9,269,199 B2
(45) Date of Patent: Feb. 23, 2016

(54) METHOD AND SYSTEM FOR MONITORING DOWNHOLE ASSETS

(71) Applicant: National Oilwell Varco, L.P., Houston, TX (US)

(72) Inventors: Steven D. Laughlin, Katy, TX (US); Russell Gilleylen, Spring, TX (US); Haresh C. Ghansyam, Pearland, TX (US); Robert G. Rector, Richmond, TX (US)

(73) Assignee: National Oilwell Varco, L.P., Houston, TX (US)

( * ) Notice: Subject to any disclaimer, the term of this patent is extended or adjusted under 35 U.S.C. 154(b) by 458 days.

(21) Appl. No.: 13/774,596

(22) Filed: Feb. 22, 2013

(65) Prior Publication Data

US 2014/0244173 A1    Aug. 28, 2014

(51) Int. Cl.
*G01V 1/40*       (2006.01)
*G07C 3/00*       (2006.01)
*G06F 15/00*      (2006.01)
*E21B 41/00*      (2006.01)

(52) U.S. Cl.
CPC . *G07C 3/00* (2013.01); *E21B 41/00* (2013.01); *G06F 15/00* (2013.01)

(58) Field of Classification Search
CPC ............ G07C 3/00; E21B 41/00; G06F 15/00
USPC ............................................................. 702/6
See application file for complete search history.

(56) References Cited

U.S. PATENT DOCUMENTS

| | | | |
|---|---|---|---|
| 5,180,014 A * | 1/1993 | Cox | 166/384 |
| 5,202,680 A | 4/1993 | Savage | |
| 5,679,894 A * | 10/1997 | Kruger et al. | 73/152.03 |
| 6,206,108 B1 * | 3/2001 | MacDonald et al. | 175/24 |
| 6,347,292 B1 | 2/2002 | Denny et al. | |
| 7,380,213 B2 | 5/2008 | Pokorny et al. | |
| 7,594,434 B2 | 9/2009 | Dagenais et al. | |
| 7,603,296 B2 * | 10/2009 | Whiteley et al. | 705/28 |
| 7,762,142 B2 * | 7/2010 | Rakow et al. | 73/761 |
| 7,946,356 B2 | 5/2011 | Koederitz et al. | |
| 7,958,715 B2 | 6/2011 | Kinert et al. | |
| 7,963,452 B2 | 6/2011 | Moritz | |
| 8,016,037 B2 | 9/2011 | Bloom et al. | |
| 8,196,649 B2 | 6/2012 | Allen et al. | |
| 2004/0078306 A1 | 4/2004 | Whiteley et al. | |
| 2006/0047379 A1 | 3/2006 | Schullian et al. | |
| 2009/0205869 A1 | 8/2009 | Prill et al. | |
| 2011/0100646 A1 | 5/2011 | Cain | |
| 2012/0010931 A1 | 1/2012 | Mehra et al. | |
| 2012/0075113 A1 | 3/2012 | Loi et al. | |

OTHER PUBLICATIONS

Canadian Office Action dated Mar. 20, 2015 for corresponding Canada Application No. 2,843,331 (4 pgs.).

* cited by examiner

*Primary Examiner* — Tung S Lau
*Assistant Examiner* — Xiuquin Sun
(74) *Attorney, Agent, or Firm* — Derek V. Forinash; Porter Hedges LLP

(57) ABSTRACT

A location of a downhole asset relative to a first environment may be tracked. The configuration information for the downhole asset is acquired, where the configuration information includes a measurement of one or more forces applied to the downhole asset during assembly of the downhole asset in the first environment. A service life of the downhole asset is determined from the configuration information. One or more parameters related to usage of the downhole environment in a second environment are measured. A remainder of the service life of the downhole asset is determined by reducing the service life by an amount proportional to usage of the downhole asset as indicated by the measurement related to usage of the downhole asset. The remaining service life may be used to automatically initiate an order for new parts.

13 Claims, 3 Drawing Sheets

METHOD AND SYSTEM FOR MONITORING DOWNHOLE ASSETS

TECHNICAL FIELD

This disclosure relates to monitoring of assets used in downhole operations.

BACKGROUND ART

U.S. Patent Publication No. 2012/0075113 to Loi et al. discloses a method and apparatus for automatic downhole asset monitoring. In the Loi et al. publication, downhole assets of interest are tagged with surface acoustic wave (SAW) or radio frequency identification (RFID) transponders. A rig reader comprising antennas and interrogators provides the ability to read tagged information from the tagged assets. The rig reader is positioned below a rig floor or rotary table, and the tags are read as the assets pass through the rig reader. A controller controls the rig reader to turn on or turn off in order to start or stop a reading process. The reader may include a motion detection device for sensing drill string motion in order to restrict reading of tags to when the drill string is moving. The controller is connected to a computer and may send collected and processed data received from the rig reader to the computer.

SUMMARY OF INVENTION

This disclosure describes monitoring of downhole assets throughout the lifetime of the downhole assets. As will be further explained, the results of the monitoring can be used for various purposes, such as determining when to retire a downhole asset, determining when to order new parts to build another downhole asset, determining how much to charge a customer for usage of a downhole asset, and so forth. The invention described in this disclosure provides an integrated approach to monitoring of downhole assets that takes into account both what happens to a downhole asset while the downhole asset is in a use environment and what happens to the downhole asset while the downhole asset is not in a use environment.

In one illustrative embodiment of the invention, a method for monitoring downhole assets comprises tracking a location of a downhole asset relative to a first environment. The method further includes acquiring configuration information of the downhole asset, wherein the configuration information comprises a measurement of one or more forces applied to the downhole asset during assembly of the downhole asset in the first environment. The method includes determining a service life of the downhole asset from the configuration information. The method includes measuring one or more parameters related to usage of the downhole asset in a second environment. The method further includes determining a remainder of the service life of the downhole asset by reducing the service life by an amount proportional to usage of the downhole asset as indicated by the measurement related to usage of the downhole asset.

In another illustrative embodiment of the invention, a system for monitoring downhole assets comprises at least one processor and a memory coupled to the at least one processor, wherein the memory stores program instructions executable by the at least one processor to (i) receive location information of a downhole asset relative to a first environment, (ii) receive configuration of the downhole asset, where the configuration information comprises a measurement of one or more forces applied to the downhole asset during assembly of the downhole asset in the first environment, (iii) determine a service life of the downhole asset using the configuration information, (iv) receive usage information of the downhole asset, where the usage information comprises usage time and one or more other usage parameters of the downhole asset in a second environment, and (v) determine a remainder of the service life of the downhole asset by reducing the service life by an amount proportional to the usage of the downhole asset as indicated by the measurement related to usage of the downhole asset.

In yet another illustrative embodiment of the invention, a system for monitoring downhole assets comprises at least one electronic tag associable with a downhole asset, the at least one electronic tag containing a unique asset identification code. The system further includes at least one reader for interrogating the at least one electronic tag for an asset identification code. The system also includes at least one downhole monitoring package associable with the downhole asset, the at least one downhole monitoring package being configured to measure and record one or more parameters related to usage of the downhole asset. The system further includes at least one processor and memory coupled to the at least one processor, wherein the memory stores program instructions executable by the at least one processor to determine a service life of the downhole asset from configuration information and usage information of the downhole asset, wherein the configuration information comprises a measurement of one or more forces applied to the downhole asset during assembly of the downhole asset.

The illustrative embodiments described above are intended to provide an introduction to the invention. They are not intended to identify key or critical elements of the invention or to delineate the scope of the invention. Various embodiments of the invention will be described in greater detail below with reference to the accompanying drawings.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DESCRIPTION OF EMBODIMENTS

Figure 1:
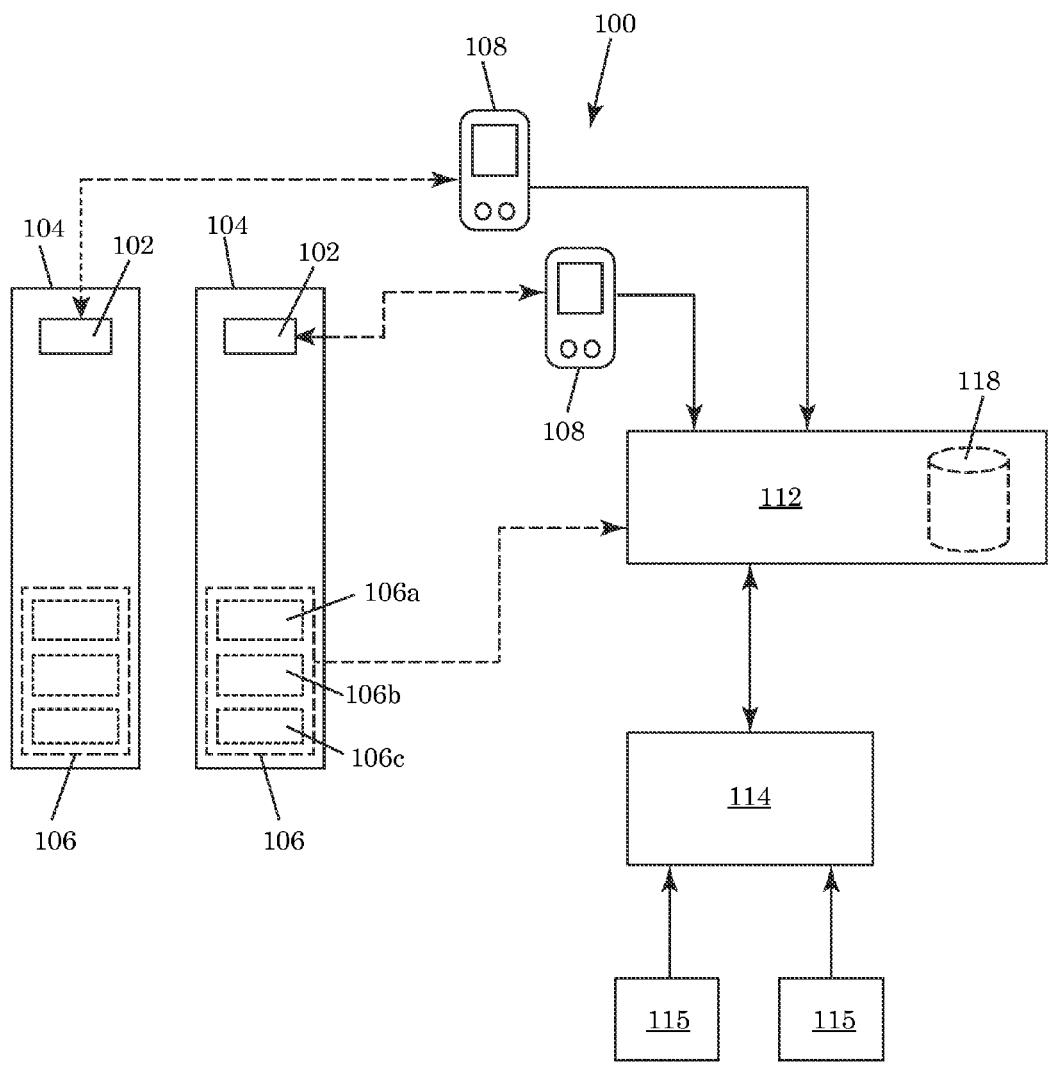
FIG. 1 is a block diagram of a system for monitoring downhole assets.

In the following description, numerous specific details may be set forth in order to provide a thorough understanding of various embodiments of the invention. However, it will be clear to one skilled in the art when the invention may be practiced without some or all of these specific details. In other instances, well-known features or processes may not be described in detail. In addition, like or identical reference numerals may be used to identify common or similar elements.

As used herein, the term "downhole asset" refers to an asset that may be used in a downhole operation, and in particular to an asset that may be included in a drill string or other tool string configured to perform a downhole operation. Examples of such assets include, but are not limited to, drill motors, jars, agitators, pipes, and the like. As used herein, a "downhole operation" is an operation carried out in a well or borehole, such as drilling and the like. Each downhole asset has a "service life," i.e., the total number of hours the downhole asset can be used in a downhole operation before the downhole asset starts providing substandard performance. At any instance, the remaining service life of the downhole asset may be estimated roughly as the service life reduced by the usage time of the downhole asset.

While the downhole asset is used in a downhole operation, the downhole asset may be exposed to distressing factors, i.e., factors that can potentially or effectively reduce the service life of the downhole asset. To obtain a more accurate estimate of the remaining service life of the downhole asset, an equivalent usage time of the downhole asset that takes into account the distressing factors may be determined. The remaining service life would then be the service life reduced by the equivalent usage time. There may also be distressing factors during assembly of the downhole asset that can potentially or effectively reduce the service life of the downhole asset. To obtain an even more accurate estimate of the remaining service life, the distressing factors during assembly of the downhole asset may be factored into an estimate of the service life of the downhole asset.

FIG. 1 shows one illustrative embodiment of a system 100 for monitoring downhole assets. The system 100 includes electronic tags 102 embedded in or attached to downhole assets 104. Each electronic tag 102 contains a unique asset identification code. The electronic tags 102 may be radio frequency identification (RFID) tags or other type of radio tags, e.g., long wavelength identification (LWID) tags. A commercial example of a LWID tag is a RuBee radio tag using IEEE 1902.1 standard. RuBee radio tags operate at low frequencies that are not attenuated by water and metal, e.g., below 450 kHz and optimally at 131 kHz, which allows RuBee radio tags to be read more accurately in environments containing a high amount of liquid and metal compared to traditional RFID tags. Each downhole asset 104 may have one or more electronic tags 102. For example, a downhole asset 104 may have more than one electronic tag 102 if the downhole asset 104 is built from multiple subunits and each of the subunits has its own electronic tag. In general, each downhole asset 104 may be uniquely identified by a single electronic tag 102 or a group of electronic tags 102. The electronic tags 102 make it possible to track the location of the downhole assets 104 in a service facility and to accurately document the history of the downhole assets.

The system 100 may include a downhole monitoring package (DMP) 106 placed within, or otherwise associated with, each downhole asset 104 for recording usage time and measuring one or more other usage parameters while the downhole asset 104 is in a use environment. Typically, the other usage parameters measured will be distressing factors. What is considered as distressing will generally depend on the nature of the downhole asset 104. Each DMP 106 may include a battery module 106a, an electronics module 106b, and sensors 106c. The electronics module 106b may include a clock, memory, and processor and may be configured to receive and process signals from the sensors 106c. The sensors 106c may be selected based on the distressing factors to be monitored. For example, if it is determined that the service life of the downhole asset 104 may be sensitive to vibration of the downhole asset and the temperature to which the downhole asset is exposed, the distressing factors monitored may include the vibration of the downhole asset and the temperature in the use environment of the downhole asset. Examples of other distressing factors are shock, strain, torque, weight, and the like. The sensors 106c may also measure parameters that may not necessarily be distressing to the downhole asset 104.

While the downhole asset 104 is in the use environment, the DMP 106 records usage time and monitors one or more distressing factors, or other usage parameters. The DMP 106 may compute equivalent usage time using the measured data and usage time. In one or more embodiments, the equivalent usage time may be computed as the usage time adjusted by a multiplier that is determined based on the portion of the measured data attributable to distressing factors of interest. For example, to account for the effects of temperature on the remaining service life of the downhole asset, a lookup table may be prepared that associates a certain multiplier with each predefined temperature range. For example, a low temperature range (e.g., ≤140° F.) may have a multiplier of 1, a medium temperature range (e.g., from 141° F. to 220° F.) may have a multiplier of 1.2, and a high temperature range (e.g., from 221° F. to 250° F.) may have a multiplier of 1.4. If accounting for effects of vibration on the remaining service life of the downhole asset, the lookup table may also include multipliers for vibration ranges.

If accounting for effects of temperature on remaining service life, the DMP 106 will collect temperature data using the appropriate sensor(s) 106c. For each segment of usage time, the DMP 106 can determine the temperature range from the measured temperature data. The DMP 106 can select the appropriate multiplier for the temperature range from the lookup table and compute the equivalent usage time for that segment of usage time. For each additional segment of usage time, the DMP 106 can compute the additional equivalent usage time. The equivalent usage times can be summed up to obtain a running (or total) equivalent usage time over a running (or total) usage time. If accounting for effects of vibration on remaining service life, the DMP 106 will collect vibration data using the appropriate sensor(s) 106c, and the appropriate vibration multiplier can be used to adjust the usage time to obtain the equivalent usage time in the same manner described above for temperature. A compound multiplier made of a temperature multiplier and vibration multiplier may be used if accounting for both the effects of vibration and temperature.

The system 100 may include an asset tracking module (ATM) 112 that records the location of each downhole asset 104 relative to the service facility during the lifetime of the downhole asset. In one or more embodiments, the ATM 112 can be used to find any downhole asset and view the configuration of the downhole asset during the lifetime of the downhole asset. The ATM 112 communicates with readers 108 that are configured to interrogate or scan the electronic tags 102 on the downhole assets 104. Each reader 108 includes the necessary circuitry or logic to communicate with the electronic tags 102 and antennas to communicate signals to and from the electronic tags 102. As part of interrogating an electronic tag 102, a reader 108 may generate electromagnetic signals with sufficient power to energize the electronic tag 102 and cause the electronic tag 102 to return a uniquely coded signal. In other cases, the electronic tags 102 may have batteries or receive power from some other source and may not need to be energized by the readers 108.

The readers 108 may be portable devices in some embodiments. In other embodiments, the readers 108 may be fixed at particular locations within a service facility, effectively turning those locations into scanning zones. In some embodiments, the reader data the reader 108 sends to the ATM 112 may include positioning information such that the ATM 112 is able to determine the location of the downhole asset referenced in the reader data automatically. Alternately, after a downhole asset is scanned into the ATM 112 by receiving appropriate data from a reader 108, the location of the downhole asset may be manually supplied to the ATM 112 and recorded against the downhole asset.

The system 100 may include a service logging module (SLM) 114 for recording and displaying information about services performed on each downhole asset 104 at any time during the lifetime of the downhole asset. In one or more embodiments, the SLM 114 may allow service reports to be generated from the recorded data. In one or more embodiments, the SLM 114 communicates with measuring devices 115 and collects data from the measuring devices 115. In some embodiments, the measuring devices 115 may include devices for measuring distressing factors on the downhole asset that may affect the service life of the downhole asset. The measuring devices 115 may further include diagnostic devices, e.g., devices that may measure conditions such as wear of the downhole asset. In one embodiment, one of the measuring devices 115 is a force measuring device for measuring one or more forces applied to the downhole assets during assembly of the downhole assets. In a particular embodiment, the force measuring device is a torque measuring device that measures torque applied to the downhole asset 104 while making up connections between subunits of the downhole asset 104. The torque measuring device may be a commercial device, such as LOG MASTER torque logger from National Oilwell Varco.

When building a downhole asset, the SLM 114 may use the ATM 112 to scan the subunits to be included in the downhole asset. The SLM 114 may further allow an electronic representation of the downhole asset to be constructed using the scanned tag information from the ATM 112. The representation may show the subunits in the downhole asset 104 as well as the connections between the subunits. As the subunits are made up, the SLM 114 receives torque data from the torque measuring device and associates the torque data with the appropriate connection in the representation of the downhole asset. The service life of the downhole asset may be determined from the configuration of the downhole asset, which in one or more embodiments takes into account the torque or other type of force applied to the downhole asset while assembling the downhole asset. A complete configuration profile of the downhole asset may then include the subunits in the downhole asset, identified by their electronic tags, the connections made in the downhole asset, the torque applied to make-up the connections, and the resulting service life.

In one or more embodiments, the ATM 112 includes, or communicates with, a master database 118 configured to store records of the downhole assets 104. For each downhole asset 104, the ATM 112 may store information related to configuration of the downhole asset, information related to services performed on the downhole asset, information related to location of the downhole asset, and information related to usage of the downhole asset. The ATM 112 may receive service and configuration data from the SLM 114. The ATM 112 may further receive data from the DMPs 106 within the downhole assets 104. The data stored in the master database 118 may be used for various purposes, such as evaluating performance of downhole assets, generating financial reports, billing customers, visualizing the condition of downhole assets, and managing inventory.

In one or more embodiments, the ATM 112 determines the remaining service life of a downhole asset 104 using monitoring data from the DMP 106 associated with the downhole asset 104 and service life of the downhole asset 104 as specified in the configuration of the downhole asset 104 (or computed from the configuration of the downhole asset 104). The remaining service life may generally be determined as the service life reduced by an amount proportional to the usage of the downhole asset as indicated by the measurement made by the DMP 106. More specifically, the remaining service life may be computed as the service life less the equivalent usage time of the downhole asset 104. The equivalent usage time may be provided with the monitoring data from the DMP 106. If the DMP 106 does not provide the equivalent usage time, the ATM 112 may determine the equivalent usage time using the monitoring data from the DMP 106. The remaining service life may be further adjusted if the downhole asset is subject to a repair service that involves disassembling and subsequently reassembling the downhole asset, i.e., the remaining service life may take into account forces applied to the downhole asset during the disassembly and reassembly.

In one or more embodiments, the ATM 112 maintains or has access to an inventory of parts that can be used to build the downhole assets. As the remaining service life of the downhole asset approaches zero, the ATM 112 can automatically initiate ordering of new parts so that fulfillment time for a new order for a downhole asset having the same configuration can be minimized. In one example, the remaining service life may be considered to approach zero if it is less than 25% of the original service life. In another example, the remaining service life may be considered to approach zero if it is less than 10% of the original service life. In general, what is considered as approaching zero may be based on the length of time it would take to receive the new order of parts.

Figure 2:
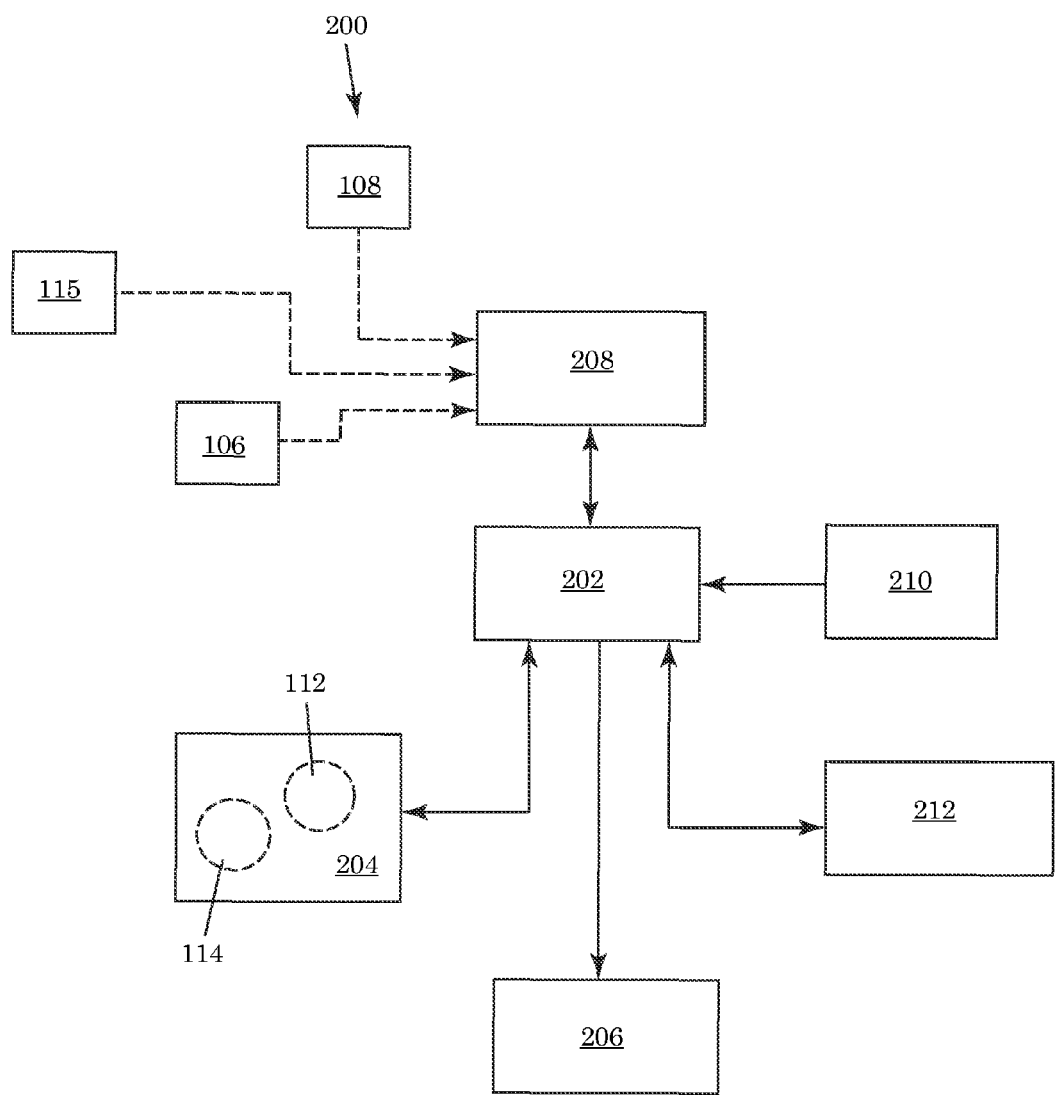
FIG. 2 is a block diagram of a computer system in which the system for monitoring downhole assets could be implemented.

In some embodiments, the modules of the system 100 are program instructions executable by at least one processor. FIG. 2 shows an exemplary computer system 200 in which the modules may be implemented. The computer system 200 may include a processor (or processors) 202, memory 204, display 206, communications interface (or device(s)) 208, and input interface (or device(s)) 210. For example, the program instructions of the ATM 112 and SLM 114 (and the database associated with the ATM 112) may be stored in the memory 204 or other data storage media 212 accessible to the computer system 200 for subsequent loading into the memory 204. Any of the ATM 112 and SLM 114 may receive data from external devices, such as the readers 108, DMPs 106, and measuring devices 115, through the communications interface 208, which may use wired and/or wireless communications protocols. Any of the ATM 112 and SLM 114 may receive user input through the input interface 210 and may present information on the display 206.

In some embodiments, the computer system 200 may be configured as a server computer, and one or more client computers, which may be located in various areas of a service facility or outside of the service facility, may communicate with the computer system 200 over a suitable network. In this case, the ATM 112 and SLM 114 may be accessible through any of the client computers. The ATM 112 and SLM 114 may be accessible through dedicated applications or web browsers on the client computers. Interaction with the ATM 112 and SLM 114 through any client computer may involve storing data locally on the client computer. The local data can be subsequently transmitted to the server computer, e.g., to allow synchronization of data across all the modules. It is also possible that the ATM 112 is implemented on a server computer while the SLM 114 is implemented in one or more client computers. The ATM 112 and SLM 114 may then communicate with each other over a suitable network. The client computers may be in the form of workstations, personal computers, tablets, smart phones, and the like.

Figure 3:
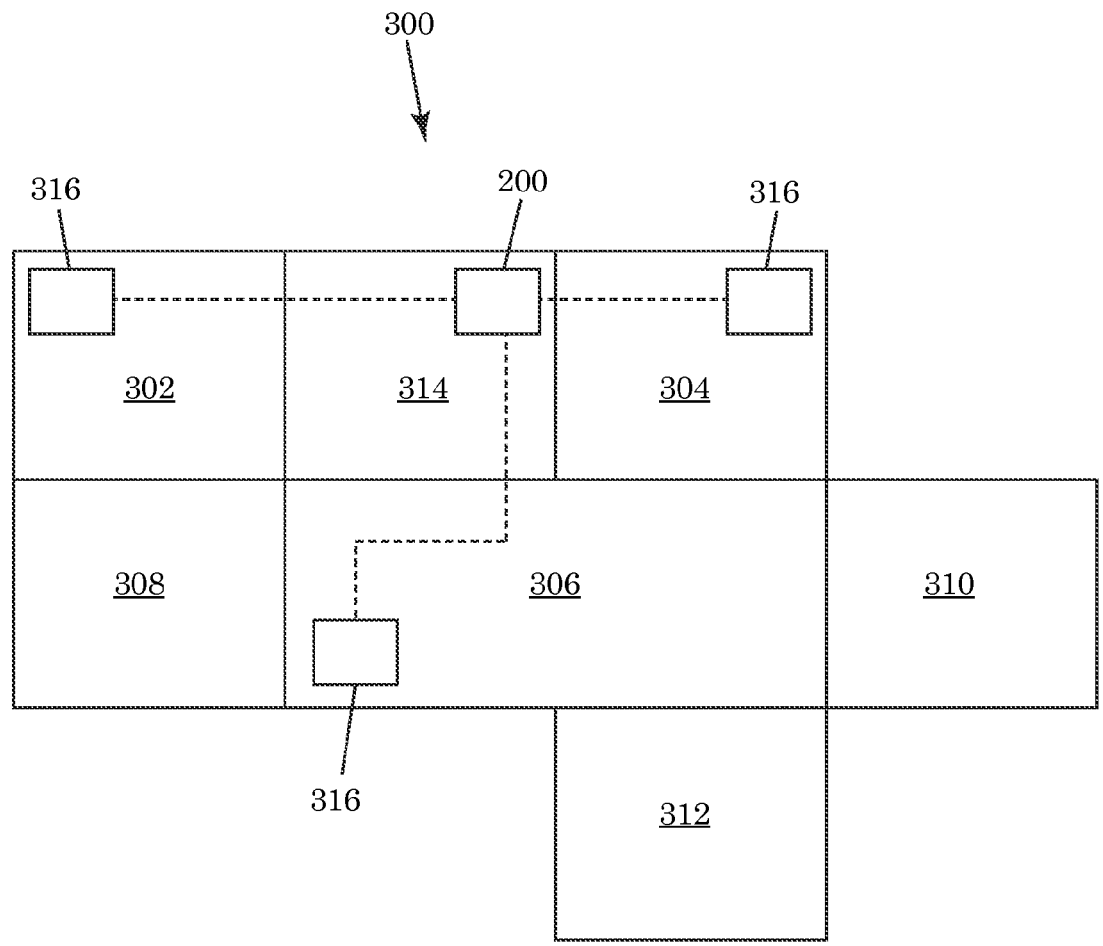
FIG. 3 is a block diagram of a service facility.

FIG. 3 shows an example of a service facility 300 having a shipping area 302 from which downhole assets may be shipped to customers, a receiving area 304 where downhole assets returned by customers may be received, a service area 306 where the downhole assets can be assembled, measured, and disassembled, a storage area 308 where downhole assets ready for use can be temporarily stored, a warehouse 310 where parts for building downhole assets may be stored, and a recycling area 312 where downhole assets with expired service life may be held. The service facility 300 may have a control area 314 where a computer system, such as computer system 200 of FIG. 2, may be located. Additional computer systems 316 may be located in some or all of the other areas of the service facility 300. The computer systems 200, 316 may communicate via a suitable network. As suggested above, the computer system 200 may be a server computer, and the computer systems 316 may be client computers. The system for monitoring downhole assets may be implemented in one or more of the computer systems 200, 316, as explained above. However, it should be noted that FIG. 3 is not intended to be a layout plan for a service facility, and the areas of the service facility 300 may not be physically connected and arranged as shown in FIG. 3.

The following are examples of monitoring downhole assets using the illustrative system described with reference to FIG. 1.

EXAMPLE 1

An order for a plurality of downhole tools, each of which has a specific configuration, is received at a service facility (e.g., 300 in FIG. 3). To fulfill the order, the subunits or parts needed to build the downhole tools are retrieved from a warehouse (e.g., 310 in FIG. 3) of the service facility. The subunits are assembled in a service area (e.g., 306 in FIG. 3) of the service facility. For each downhole tool to be built, a request is made to the ATM 112 to create a new downhole asset. When the ATM 112 receives the request, the ATM 112 creates a new record in its master database 118. The electronic tags on the subunits that are to be included in the downhole tool are scanned using one or more of the readers 108, and the ATM 112 associates the scan data with the record.

For each downhole tool to be built, an electronic representation of the downhole tool is made in the SLM 114. Then, the downhole tool is assembled from the subunits according to the electronic representation. As the downhole tool is assembled, the torque applied to make connections is measured and recorded against the connections. After the assembly is complete, the SLM 114 determines the expected service life of the downhole asset based on the configuration of the downhole asset. The configuration information of the downhole tool is then transmitted to the ATM 112, which records the configuration information against the downhole asset record created for the downhole tool. The configuration information can include information about the subunits included in the downhole tool, the connections made between the subunits, the torque applied to make the connections, and the service life of the downhole tool as configured. The assembly session on the downhole tool is closed, and the downhole tool is moved to a storage area (e.g., 308 in FIG. 3) or shipping area (e.g., 302 in FIG. 3) of the service facility.

A shipping ticket is created for the order using the ATM 112. The shipping ticket includes a list of all the downhole tools to be delivered to the customer. After creating the shipping ticket, the downhole tools listed in the shipping ticket are brought from the storage area or service area into the shipping area. In the shipping area, the electronic tags on the downhole tools are scanned into the ATM 112, which immediately brings up the complete setup of each downhole tool, obviating the need to manually check the assembly details of the downhole tool. When all the downhole tools have been scanned, the ATM 112 generates or prints the shipping ticket. As part of generating or printing the shipping ticket, the ATM 112 creates a certificate of conformance for each downhole tool from the stored configuration of the downhole tool. The certificate of conformance certifies that the downhole tool as built meets all specifications. The ATM 112 further notes in its database 118 that the downhole tools have been shipped.

EXAMPLE 2

A downhole tool is returned to the receiving area (e.g., 304 in FIG. 3) of the service facility after use by a customer. The downhole tool is scanned into the ATM 112, which records the return of the downhole tool. Along with recording the return of the downhole tool, the ATM 112 receives monitoring data from the DMP associated with the downhole tool. The ATM 112 updates the record of the downhole asset in its database 118 with the received information. If the monitoring data was not accompanied by the equivalent usage time, the ATM 112 computes the equivalent usage time. The ATM 112 may further use the monitoring data or equivalent usage time to determine the usage cost of the downhole asset for the period of use.

EXAMPLE 3

The ATM 112 determines the remaining service life of a downhole tool returned to the service facility after a period of use. The ATM 112 uses the equivalent usage time of the downhole tool and the service life of the downhole tool to determine the remaining service life. The equivalent usage time is computed from the usage time of the downhole tool taking into account distressing factors of interest during use of the downhole tool, as already explained above. The service life may be part of the configuration information of the downhole tool and may have been adjusted to take into account the forces applied to the downhole tool while assembling the downhole tool.

EXAMPLE 4

At the end of Example 3, the ATM 112 may find that the remaining service life of the downhole tool is substantially greater than zero, which means that the downhole tool could be used in another downhole operation. If the ATM 112 finds that the remaining service life is substantially greater than zero, the downhole tool is moved to the service area for diagnostics. Through the SLM 114, any number of measurements are made on the downhole tool, e.g., using the measuring devices 115 or manually, and recorded. Measurements are made to assess the condition of the downhole tool. Conditions such as component wear may be measured or inspected, for example.

EXAMPLE 5

At the end of Example 4, the diagnostics may show that the downhole tool is in good condition based on predetermined criteria. If the diagnostics shows that the downhole tool is in good condition, the diagnostics session for the downhole tool is closed in the SLM 114. The downhole tool is assembled as ordered by the customer. Following assembly, the downhole tool is moved to the storage area or shipment area of the service facility for subsequent shipping to the customer. The ATM 112 records the new location of the downhole tool in its database.

EXAMPLE 6

At the end of Example 4, the diagnostics may show that the downhole tool is in poor condition based on predetermined criteria. If the diagnostics shows that the downhole tool is in poor condition, the SLM 114 informs the ATM 112 about the condition of the downhole tool. The ATM 112 records the condition of the downhole tool in the relevant downhole asset record and may initiate an order for new parts in preparation for building another downhole tool or replacing some parts of the downhole tool that are in poor condition. The diagnostics session for the downhole tool is closed in the SLM 114. The downhole tool remains in the service area for possible rep air.

EXAMPLE 7

At the end of Example 3, the ATM 112 may find that the remaining service life of the downhole is zero or near zero (e.g., less than 1% or 0.5% of the original service life), which means that the downhole tool should not be used in another downhole operation as-is. If the ATM 112 finds that the remaining service life is zero or near zero, the downhole tool is taken to the recycle area (e.g., 312 in FIG. 3). The ATM 112 records the new location of the downhole tool. Meanwhile, the ATM 112 may initiate an order for new parts in preparation for building a new downhole tool having a similar configuration to the one whose remaining service life is down to zero or near zero.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of monitoring downhole assets, comprising:
   (a) providing a system including at least one electronic tag containing a unique identification code, at least one reader, at least one downhole monitoring package, and at least one force measuring device;
   (b) assembling a downhole asset in a first environment;
   (c) measuring one or more forces applied to the downhole asset during assembly of the downhole asset with the at least one force measuring device;
   (d) associating the at least one electronic tag and the at least one downhole monitoring package with the downhole asset;
   (e) interrogating the at least one electronic tag for the unique identification code using the at least one reader;
   (f) storing in a database configuration information of the downhole asset, the configuration information comprising the unique identification code, and a service life of the downhole asset that is determined from the measurement of the one or more forces applied to the downhole asset during assembly of the downhole asset in the first environment;
   (g) measuring and recording one or more parameters related to usage of the downhole asset in a second environment using the at least one downhole monitoring package; and
   (h) displaying a remainder of the service life of the downhole asset determined by reducing the service life stored in the database by an amount proportional to usage of the downhole asset as indicated by the record of the one or more parameters related to usage of the downhole asset in the second environment.

2. The method of claim 1, further comprising disassembling the downhole asset and repeating step (b) through step (h) for the downhole asset.

3. The method of claim 1, wherein the determining of the service life in step (f) comprises determining an equivalent usage time of the downhole asset from the one or more parameters related to usage of the downhole asset and determining the remainder of the service life by reducing the service life by the equivalent usage time.

4. The method of claim 1, wherein the first environment is a service facility environment and the second environment is a downhole environment.

5. The method of claim 1, wherein step (c) comprises measuring torque applied to the downhole asset during assembly of the downhole asset.

6. The method of claim 1, wherein step (g) comprises measuring at least one of vibration of the downhole asset and temperature in the second environment.

7. The method of claim 1, wherein step (g) comprises recording a usage time of the downhole asset in the second environment.

8. The method of claim 1, wherein step (e) comprises scanning the at least one electronic tag associated with the downhole asset.

9. The method of claim 1, comprising:
   receiving location information of the downhole asset;
   receiving the configuration information of the downhole asset;
   receiving usage time and one or more other usage parameters of the downhole asset in the second environment; and
   determining the remainder of the service life of the downhole asset by reducing the service life by an amount proportional to usage time, a proportionality multiplier being indicated by the one or more other usage parameters.

10. A system for monitoring downhole assets, comprising:
    at least one electronic tag associable with a downhole asset, the at least one electronic tag containing a unique asset identification code;
    at least one reader for interrogating the at least one electronic tag for an asset identification code;
    at least one downhole monitoring package associable with a downhole asset, the at least one downhole monitoring package being configured to measure and record one or more parameters related to usage of the downhole asset;
    at least one force measuring device for measuring one or more forces applied to the downhole asset during assembly of the downhole asset;
    at least one processor; and
    a memory coupled to the at least one processor, wherein the memory stores program instructions executable by the at least one processor to display a remainder of a service life of the downhole asset determined from configuration information and the one or more parameters related to usage of the downhole asset, the configuration information comprising the asset identification code and a service life determined from the measurement of the one or more forces applied to the downhole asset during assembly of the downhole asset.

11. The system of claim 10, wherein the at least one electronic tag is selected from a radio frequency identification tag and a long wave identification tag.

12. The system of claim 10, wherein the at least one downhole monitoring package comprises one or more sensors to measure at least one of vibration of the downhole asset and temperature in an environment in which the downhole asset is used.

13. The system of claim 10, wherein the at least one force measuring device is a torque measuring device.

\* \* \* \* \*